UNITED STATES PATENT OFFICE 2,130,095

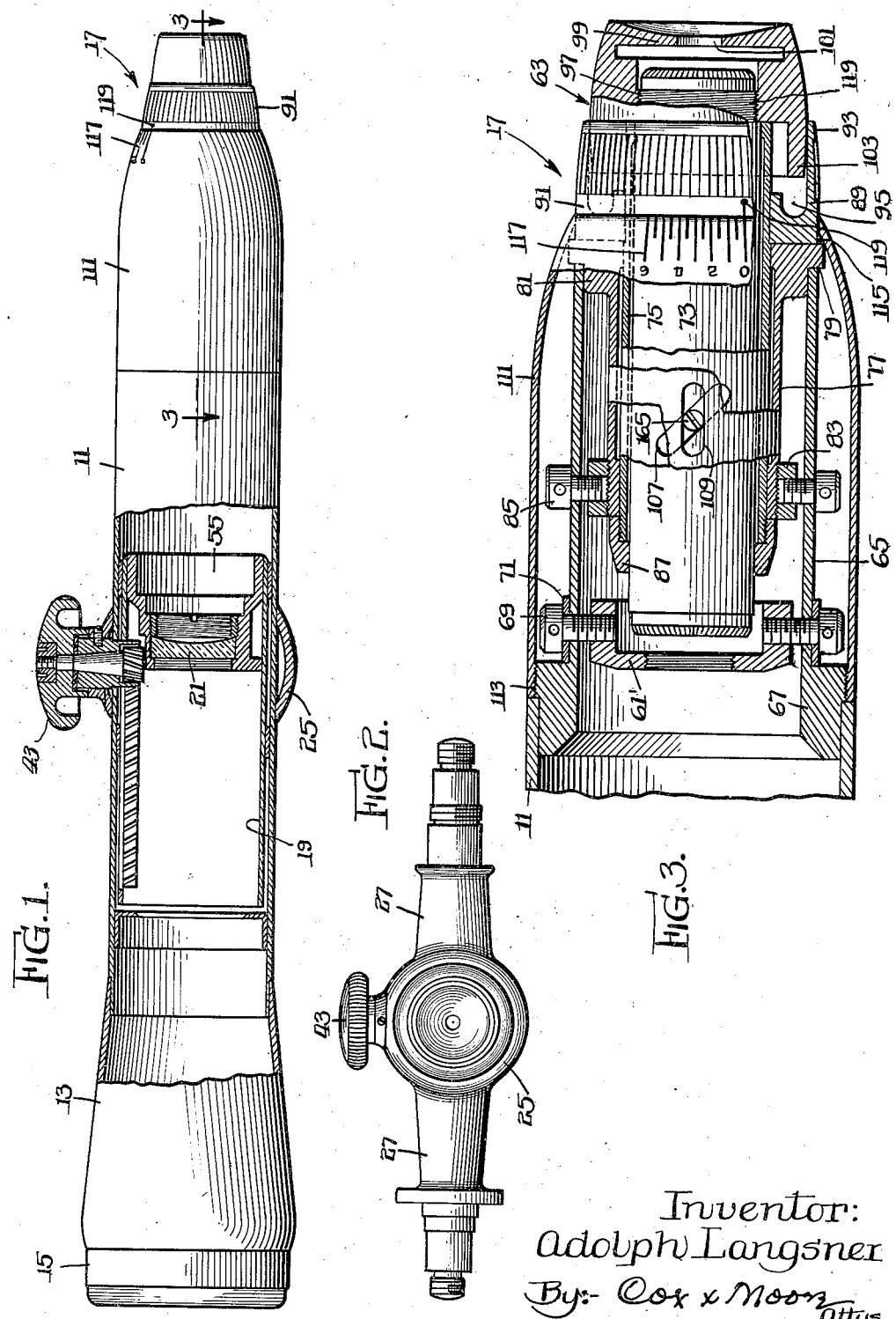

TELESCOPE

Adolph Langsner, Chicago, Ill., assignor to Eugene Dietzgen Company, Chicago, Ill., a corporation of Delaware Application February 1, 1935, Serial No. 4,433

8 Claims. (Cl. 88—32)

My invention relates in general to telescopes and has more particular reference to telescopes for use in surveying instruments, such as levels, transits, and the like.

An important object is to provide an improved dustproof focusing eyepiece construction for a telescope, the eyepiece construction being adapted for adjustment from outside of the barrel of the telescope while preventing entrance of dust and other foreign matter.

Another important object is to provide an improved eyepiece construction for telescopes wherein the eyepiece has manually operable focusing means accessible from outside of the telescope and also adjusting means for positioning the axis of the eyepiece in alignment within the telescope barrel, including the provision of co-operating eyepiece parts adapted to seal the same against the entrance of dust and other foreign matter into the eyepiece between the relatively shiftable focusing means, the co-operating parts serving also to cover and conceal the means for adjusting the eyepiece axis and prevent entrance of foreign matter at said axis adjusting means.

Another important object is to provide an improved eyepiece construction for telescopes including an adjustable reticle mounted as an integral part of the eyepiece assembly, whereby the eyepiece and reticle may be mounted in the telescope as a unit.

Another important object is to provide a telescope having an eyepiece construction embodying an adjustable reticle including cover means adapted for mounting in the telescope in position to enclose the eyepiece in dust-proof manner, said cover means being readily removable to expose the reticle adjusting means and, when in closed position, serving to protect the telescope against the entrance of foreign matter through said adjusting means.

Numerous other objects and advantages of the invention will be apparent from the following description, which, taken in connection with the accompanying drawing, discloses a preferred embodiment of the invention.

Referring to the drawing:

Figure 1 is an elevational view of a telescope embodying my present invention, parts of the device being shown in section to reveal the details of construction;

Figure 2 is an elevational view of the device viewed from the right-hand end of the instrument as shown in Figure 1; and Figure 3 is a section on line 3—3 in Figure 1.

To illustrate my invention, I have shown on the drawing, a telescope 11, more especially adapted for use in a transit, although the features of my present invention may, with equal facility, be applied in telescopes for use in other instruments, including levels and alidades, and in telescopes generally regardless of special use, scope or purpose, as will become apparent as the description proceeds.

The telescope, as shown in the accompanying drawing, may comprise a tubular barrel preferably of cylindrical configuration, which is or may be belled or enlarged at one end, as at 13, to receive an objective lens assembly 15. The telescope barrel, at the end opposite the objective lens assembly, is fitted with an eyepiece assembly 17 and the barrel may carry an objective slide 19 therein between the eyepiece and lens assemblies 15 and 17. This objective slide 19 preferably carries the usual focusing lens 21 and is movable within the barrel for the purpose of focusing the telescope, suitable manually operable means, shown as a knob 43 mounted externally on the barrel, being provided for moving the objective slide.

The barrel of the telescope may, if desired, be carried in a mounting or support comprising, in the illustrated embodiment, an annular collar 25 snugly fitted to and embracing the outer surfaces of the barrel. This collar may, as shown, be formed with means such as the arms 27 for mounting the telescope in a support such as the frame of a transit, for example. The barrel mounting collar 25, in the illustrated embodiment, serves also as a support for the objective slide adjusting means but I do not herein claim the novel features of the barrel support and of the objective slide adjusting means, neither separately nor in combination, since the same form the subject-matter claimed in my copending divisional application for United States Letters Patent for Telescope, Serial No. 181,678, filed Dec. 24, 1937.

I have, however, provided an improved eyepiece construction for use in sighting devices, such as telescopes, which eyepiece may conveniently be arranged as an assembly on a frame 65, preferably formed, as at 67, for attachment in the eyepiece end of the telescope barrel.

The eyepiece assembly shown to demonstrate my present invention comprises an adjustable cross hair reticle 61 and adjustable means 63 for focusing the eyepiece upon the cross hairs of the reticle, the reticle and focusing means being arranged as a unit for assembly in the telescope and including cooperating parts adapted to exclude foreign matter from entering the eyepiece as well as the barrel of the telescope.

To this end the portion 67 may be threaded, welded, or otherwise secured in any suitable or convenient fashion to the barrel of the telescope. The remaining portions of the frame 65 project outwardly of the end of the barrel in position to support the reticle 61 and the focusing means 63, said outwardly projecting portions having an overall or external dimension substantially less than the overall dimension of the telescope barrel. The eyepiece reticle 61 comprises a cross hair support adapted to be mounted within the frame 65 adjacent the portion 67 by means of adjusting screws 69 threaded into the reticle and having heads extending outwardly of and bearing on suitable bearing means 71 on the outer surface of the frame 65, so that by manipulating the heads of the members 69, the position of the reticle within the tubular frame 65 may be accurately adjusted. The bearing means 71 may comprise a perforated strip or strips or perforated plates of suitable bearing material, such as copper, disposed beneath the heads of the adjusting screws and through the perforations of which the shanks of said screws extend. If desired, suitable bearing means may be interposed between the heads of the members 69 and the sleeve 65. The eyepiece focusing means 63 preferably comprises a lens carrying tube or frame 73 enclosed in a sleeve-like element 75. The element 75 in turn is supported in another sleeve-like member 77, the outer end of which is carried in the outer end of the support frame 65, said sleeve 77 being formed with an annular portion 81 providing a seat fitting within the end of the support frame and an annular flange 79 overlying the end of the frame. The inner end of the sleeve 77 is received in a collar 83, which is adjustably supported within the frame 65 by means of adjusting screws 85, somewhat similar to the reticle adjusting fingers 69. The adjusting screws 85 have heads extending outwardly of and bearing on the outer surfaces of the sleeve-like members 65, so that manipulating the heads of the members 85, the position of the inner end of the sleeve 77 within the frame 65 may be adjusted. The sleeve 75 projects at its inner end beyond the inner end of the sleeve 77 and is threaded to receive a holding collar 87 by means of which relative axial movement of the sleeve 75 within the sleeve 77 toward the right, viewing Figure 1, is prevented. The sleeve 75 outwardly of the collar 81, carries an annular element 89, the outer surfaces of which are or may be knurled as at 91 to facilitate turning of the same, the element 89 being fast on the sleeve 75. One face of the annular element 89 is formed for snug seating engagement with the collar 81 and prevents relative axial movement of the sleeve 75 within the sleeve 77 toward the left, viewing Figure 1. The opposite side of the annular element 89 is formed to provide an extending lip 93 and an annular outwardly facing groove 95 within said lip, said groove 95 being disposed between the lip and the outer end of the sleeve 75, which extends outwardly to a point opposite said lip. The lens carrying tube 73 projects at one end opposite the reticle and at its other end from the outer end of the sleeve 75. The projecting end of the tube 73 is threaded, as at 97, to receive a cover 99 affording a peep hole 101 opposite the outer end of the lens carrying tube. The cover 99 has an annular flange 103 extending within the lip 93 of the turnable element 89 and the annular space between the interfitting lips 93 and 103 and the outer end of the sleeve 75 may be filled with resilient packing for the purpose of catching foreign matter, which may enter between the lips and thus prevent such foreign matter from gaining access to the telescope between the sleeve 75 and the lens carrying tube 73. The lens carrying tube 73 has a radially extending pin 165 fixed therein in position to extend into and through a diagonal slot 107 formed in the sleeve 75 and a longitudinal slot 109 in the sleeve 77, so that by rotating the sleeve 75 by manipulating the collar 89, the relative movement of the slotted sleeve portions 107 and 109 will cause the pin 165 and consequently the sleeve 73, in which it is fixed, to move longitudinally of the sleeve 75, depending upon the direction of rotation imparted to the collar 89, so that by turning said collar in one direction or the other, the lenses in the element 73 may be focused accurately upon the cross hairs of the reticle 61.

I have already explained that yielding material may be interposed in the opening between the interfitting lips 93 and 103 and the sleeve 95 to prevent access of foreign matter to the outer end of the lens carrying element but I also provide a cover 111 for enclosing and preventing access of foreign matter to the heads of the adjusting members 69 and 85. This cover 111 comprises a preferably tubular sleeve threaded at one end as at 113 to engage screw threads formed in the frame portion 67 adjacent and outwardly of the end of the telescope barrel in which said frame is mounted so that, when the cover 111 is threaded on the portion 67, its end will abut the end of the barrel of the telescope and form a continuation of the outer surface thereof. The opposite end of the tubular cover member 111 is formed to snugly engage the outer surface of the adjusting collar 89 adjacent the collar 81 on which the same is seated, and resilient packing means 115 may, if desired, be interposed between the collars 81 and 89 and the end of the cover element 111, whereby to prevent foreign matter from entering the eyepiece assembly between said collars.

It will be seen, therefore, that the cover 111, when mounted in position threaded on the frame portion 67, serves not only to enclose and protect the heads of the adjusting members 69 and 85 but also seals the assembly against the entrance of foreign matter between the relatively shiftable collars 81 and 89. The cover 111, however, may readily be removed in order to permit access to the adjusting members 69 and 85 whenever it is necessary to manipulate these elements for the adjustment of the reticle or of the axial position of the lens carrying element 73.

The cover 111 and the surface of the adjusting collar 89 may be provided with a scale 117 and a cooperating gage mark 119 for the purpose of giving visual indication of the internal adjustment of the shiftable sleeve 73.

It is thought that the invention and numerous of its attendant advantages will be understood from the foregoing description and it is obvious that numerous changes may be made in the form, construction and arrangement of the several parts of the illustrated apparatus without departing from the spirit or scope of my invention or sacrificing any of its attendant advantages, the preferred form herein described being merely for the purpose of illustrating the invention.

I claim:

1. A telescope comprising a barrel including a tubular portion forming an eyepiece support, an adjustable eyepiece unit on said support comprising eyepiece means including an eyepiece shiftable in said support, means for focusing said eyepiece comprising a turnable focusing element carried on said support and projecting at an end thereof, adjusting means exposed outwardly of said support for adjusting said eyepiece and focusing means laterally in said frame, cover means comprising a sleeve-like shell secured at one end on said barrel in position enclosing said exposed adjusting means, the other end of said sleeve-like shell forming a running seal with the projecting portions of said focusing element to prevent access of foreign matter between the turnable focusing element and the said cover means.

2. A telescope comprising a barrel, means for mounting an adjustable eyepiece on said barrel comprising tubular means forming an extension on said barrel, a sleeve movably mounted within said extension, means disposed outwardly of and carried by said extension and co-operatively associated with the sleeve within the extension for adjusting laterally the axial position of said sleeve, cover means enclosing said extension and the outwardly exposed adjusting means thereon, focusing means comprising a lens-carrying member longitudinally movable in said sleeve, and actuating means for said focusing means carried by said sleeve and operatively associated with said sleeve and focusing means, said actuating means extending outwardly of said sleeve and cover to permit manipulation of the same, said sleeve, cover, and outwardly extending portions of the actuating means co-operating to prevent the entrance of foreign matter into the sleeve.

3. A telescope as set forth in claim 2, including co-operating means forming a scale, and a gauge mark formed on the adjacent exposed portions of the cover and outwardly extending portions of the actuating means.

4. A telescope comprising a barrel and a dustproof eyepiece unit on the end of the barrel, said unit comprising a tubular frame on and projecting outwardly of the end of the barrel, a support sleeve within the frame, said sleeve being supported at one end in the outer end of the frame, said sleeve having portions extending within the frame, adjusting means on the frame, accessible outwardly of the lateral walls thereof and operable to adjust the inwardly extending portions of said sleeve laterally within the frame, a turnable tube within the sleeve and having a head extending outwardly of and bearing upon the outer end of the sleeve, outwardly of said frame, an eyepiece extending within said tube and outwardly of the outer end thereof, and a sleeve-like dust excluding cover sealingly connected at one end on said frame inwardly of said adjusting means and sealingly engaging said head at the other end of said cover, said sleeve enclosing said adjusting means and the joint between said head and said support sleeve.

5. A telescope as set forth in claim 4, wherein said cover, at one end, is in abutting relation with the end of the barrel and forms a continuation thereof.

6. A telescope as set forth in claim 4, wherein said cover is removably connected to the support sleeve and may be removed to reveal the adjusting means by sliding the same axially over the head.

7. A telescope as set forth in claim 4 wherein the head and co-operating end of the cover are provided one with a graduated scale and the other with an index.

8. A telescope comprising a barrel, adjustable means on said barrel at one end thereof, including an eyepiece, and means for focusing said eyepiece comprising a cylindrical focusing element supported and turnable in said barrel and having a portion projecting at an end of the barrel, said eyepiece extending within said cylindrical focusing element and having an exposed end protruding at the projecting end of said focusing element, an end cover on the protruding end of said eyepiece, a collar on the projecting end of said focusing element, said collar having a marginal flange and said end cover having a cylindrical portion fitting within and bearing upon the inner surfaces of said flange whereby to substantially prevent the entrance of foreign matter between the interfitting portions of said end cover and turning collar, the outer surfaces of said turning collar being manually operable to turn the focusing element for the purpose of focusing said eyepiece.

ADOLPH LANGSNER.